Jan. 5, 1937.　　　　C. H. WILD　　　　2,066,869
CONVEYER DIVIDER
Filed Nov. 30, 1935　　　6 Sheets-Sheet 1

INVENTOR.
Charles H. Wild
BY
William W. Varney
ATTORNEY.

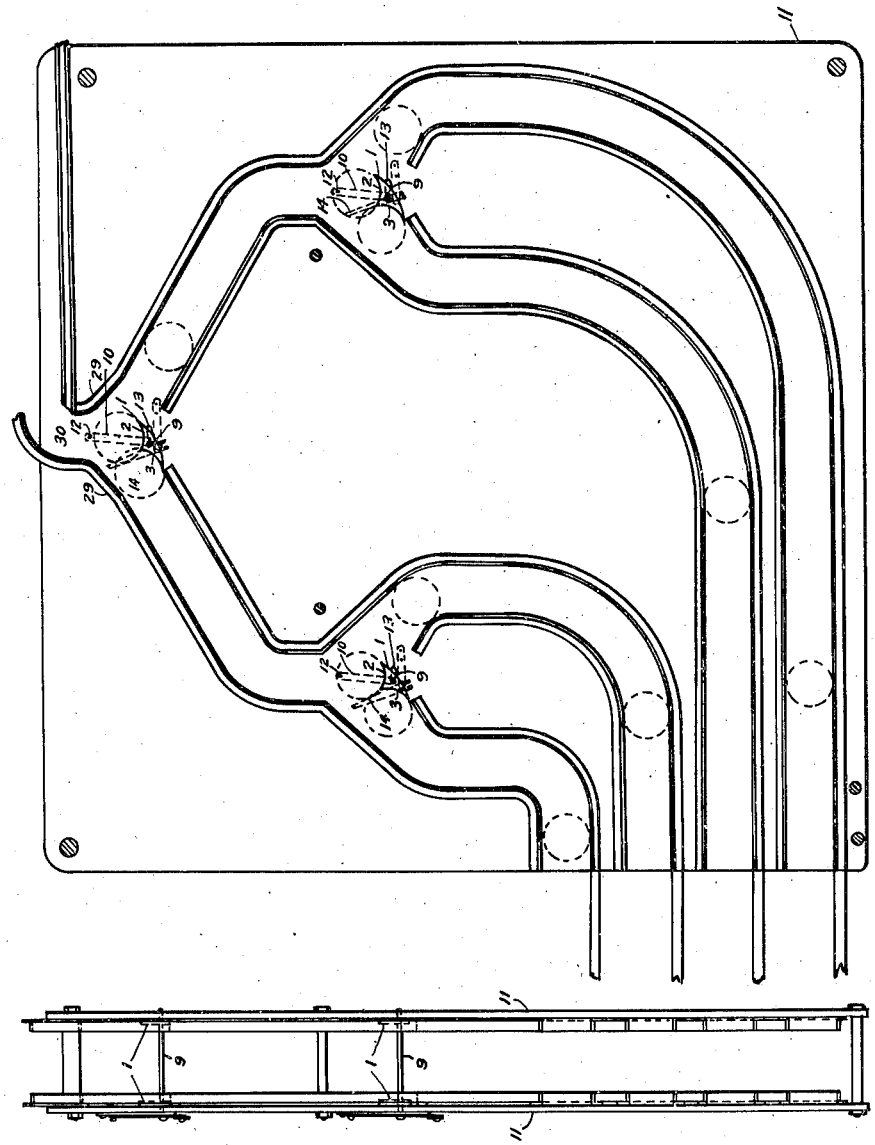

Jan. 5, 1937.  C. H. WILD  2,066,869
CONVEYER DIVIDER
Filed Nov. 30, 1935  6 Sheets-Sheet 4

INVENTOR.
Charles H. Wild
BY
William W. Varney
ATTORNEY.

Jan. 5, 1937.  C. H. WILD  2,066,869
CONVEYER DIVIDER
Filed Nov. 30, 1935  6 Sheets-Sheet 5

INVENTOR.
BY Charles H. Wild
William W. Varney
ATTORNEY.

Jan. 5, 1937. C. H. WILD 2,066,869
CONVEYER DIVIDER
Filed Nov. 30, 1935 6 Sheets-Sheet 6

INVENTOR.
Charles H. Wild
BY William W. Varney
ATTORNEY.

Patented Jan. 5, 1937

2,066,869

UNITED STATES PATENT OFFICE 2,066,869

CONVEYER DIVIDER

Charles H. Wild, Baltimore, Md., assignor to Burt Machine Company, Incorporated, Baltimore, Md., a corporation of Maryland Application November 30, 1935, Serial No. 52,338

8 Claims. (Cl. 193—39)

In the canning, bottling and other industries, articles are conveyed from various points for the purpose of labelling, filling, sealing, packing, casing, etc.

I am aware that dividers are old in the conveying industry both as to passages through which bodies roll and as to conveying belts or movable conveyers provided with dividing means thereon or thereover.

I would call attention to my issued Patent No. 1,993,079, issued March 5, 1935, which patent discloses much of the invention herein set forth.

The object of my invention is a dividing means for guiding or directing bodies from a single passage into a plurality of passages of different elevations.

A further object of my invention is an improved divider or dividing means of the vane-operating type mounted on a movable mounting.

A further object of my invention is improved means for mounting a divider vane in a conveyer system comprising providing means for moving the mountings thereof and maintaining said mountings in said moved position.

A further object of my invention is the providing of means in a conveyer system to regulate the filling of a plurality of passages in succession with bodies from a single passage whereby succeeding bodies passing filled passages after filling are uninterrupted in their passage over said filled passage to succeeding passages.

With the foregoing and other objects in view, my invention consists of the methods employed, combination and arrangement of apparatus and means as hereinafter specifically set forth and illustrated in the accompanying drawings wherein is shown the preferred embodiment of my invention, but it is understood that changes, variations and modifications may be resorted to which come within the scope of the claims hereunto appended.

Figure 1:
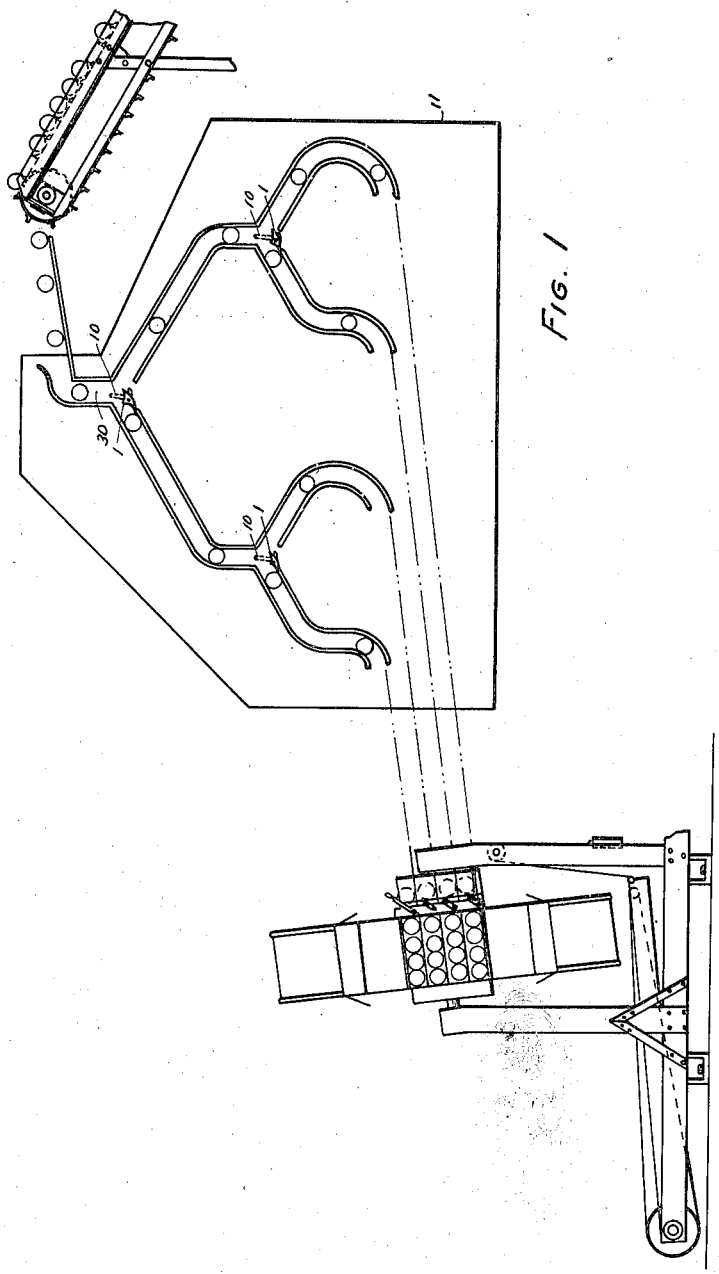
Figure 2:
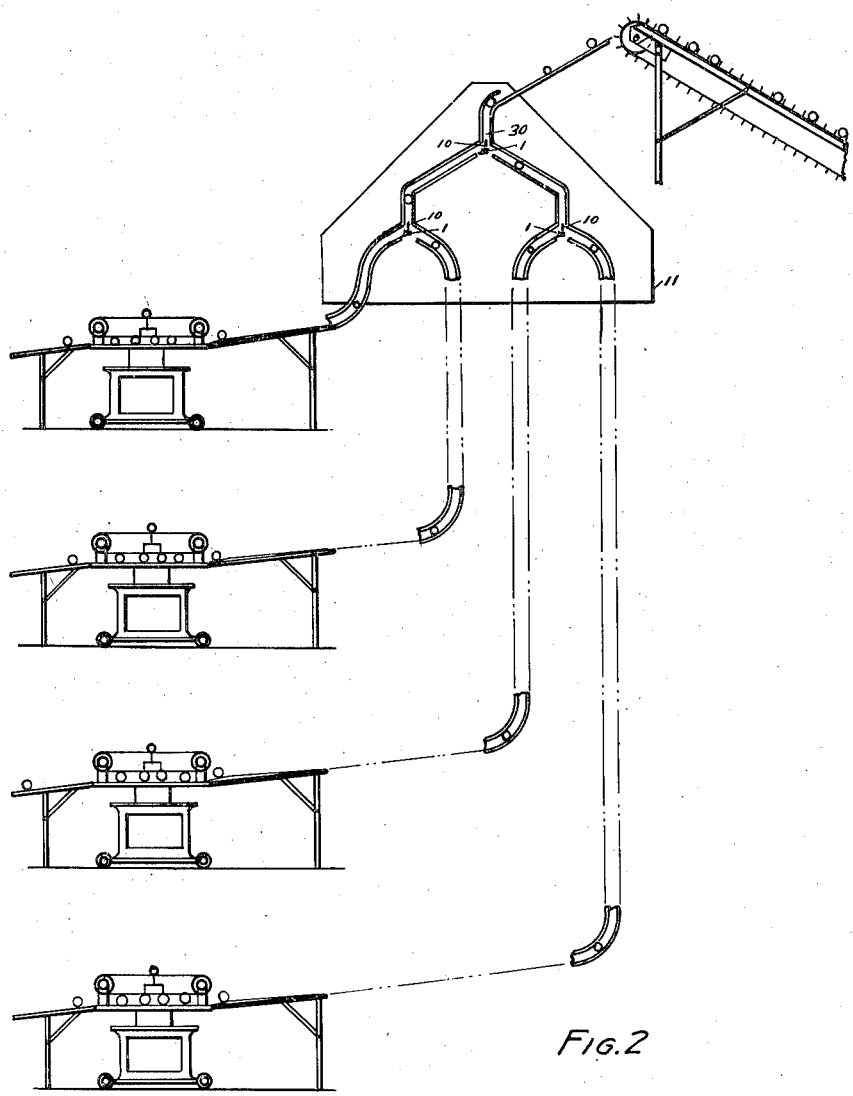
Figure 4:
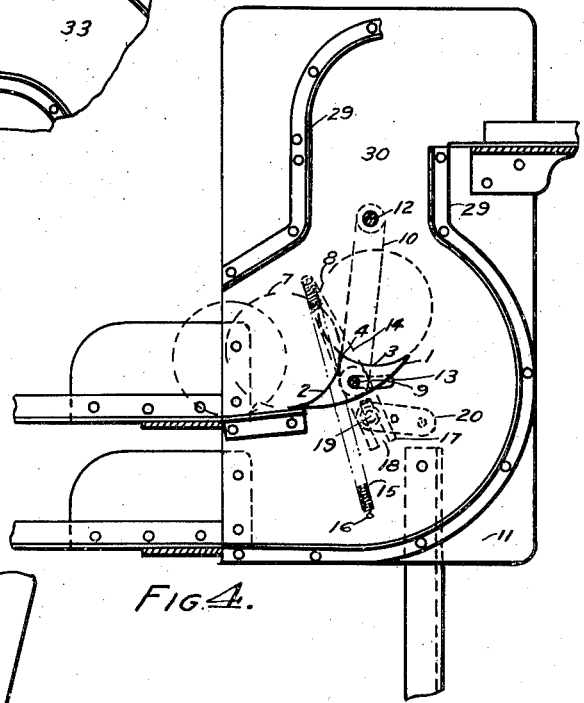
Figure 5:
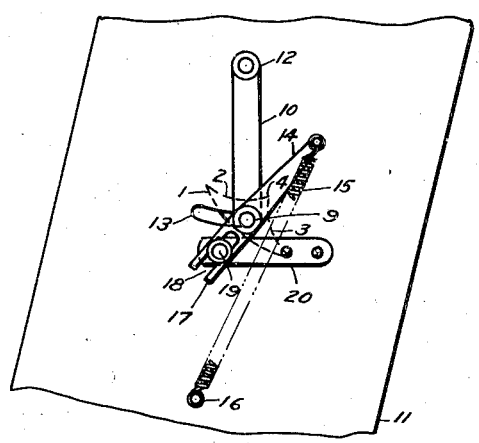
Figure 6:
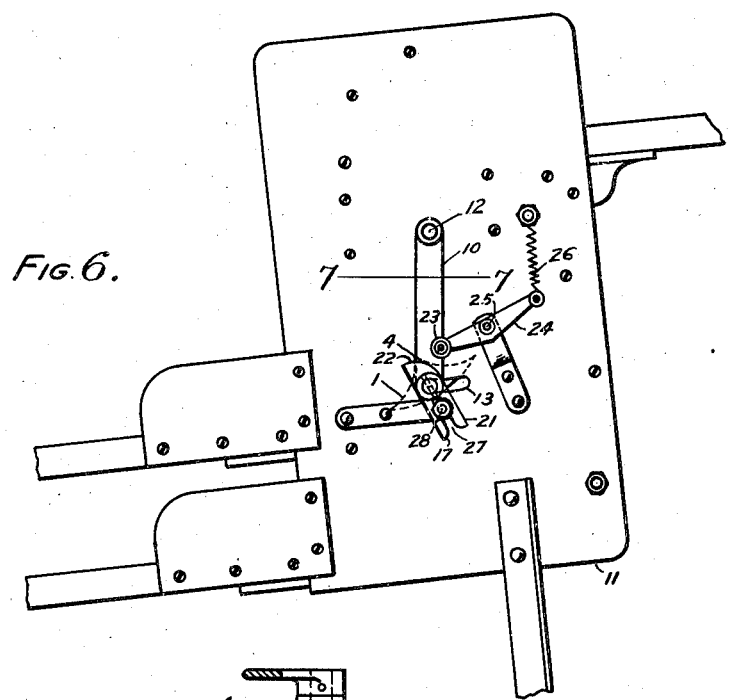
Figure 7:
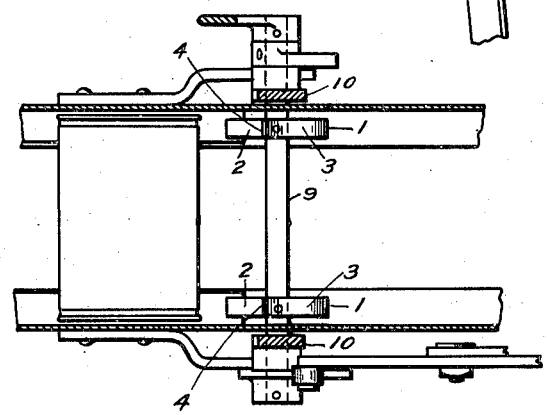

In the drawings of the herein-described embodiment of my invention, Figure 1 is a general schematic outline in fragmentary section of the application of my invention to a casing machine, such as is shown in my aforementioned Patent No. 1,993,079. It will be noticed that in this view the divided passages are at different elevations in order to supply cans to the casing machine at different elevations. Fig. 2 is a general schematic outline in fragmentary section of the application of my invention applied to a plurality of labelling machines. In this case it will be noticed that the divided passages are at different elevations. The divider vane and mounting where the mounting is fixed, may be used in place of the divider with a movable mounting as shown. Fig. 3 is an enlarged view in fragmentary section of the dividing mechanism shown in Figs. 1 and 2; Fig. 4 is an enlarged view in fragmentary section taken in the particular plane of the path of the cans, showing the intake end of the machine, and particularly the can separator as shown in my aforementioned Patent No. 1,993,079 and is similar to Fig. 8, which latter view shows my invention as applied in Fig. 1 of this application; similarly, Fig. 5 is a fragmentary rear elevation showing the separator mechanism as it appears from the outside of the machine; similarly, Fig. 6 is an elevation of the intake end of the machine, showing the external portion of the can divider mechanism; Fig. 7 is a horizontal sectional view on the line 7—7 of Fig. 6.

Figure 8:
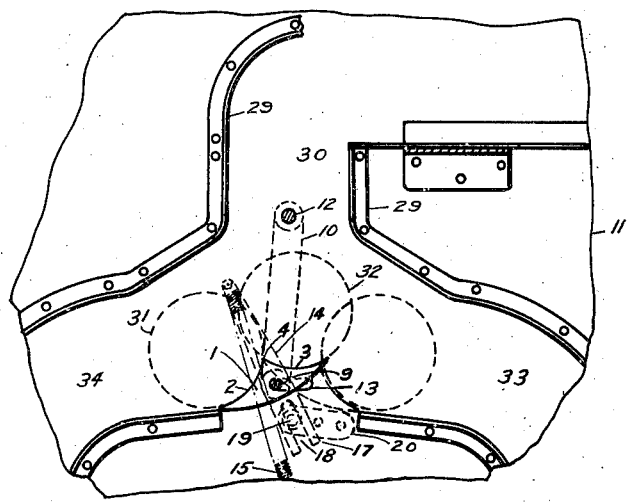
Figure 10:
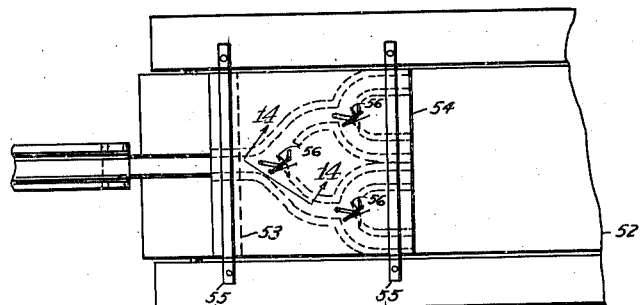
Figure 11:
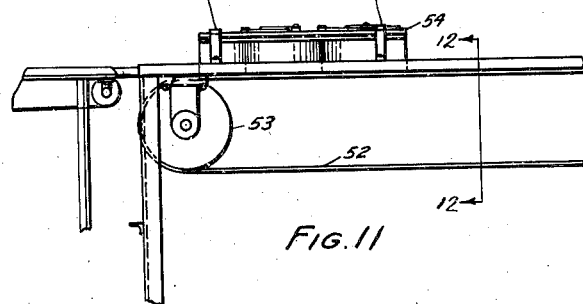
Figure 12:
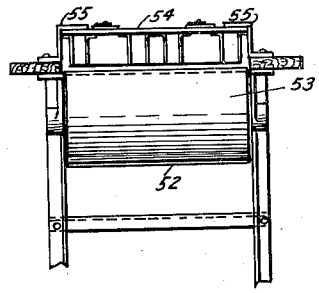
Figure 13:
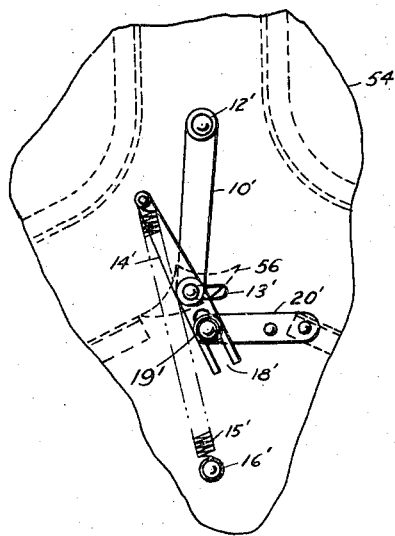
Figure 14:
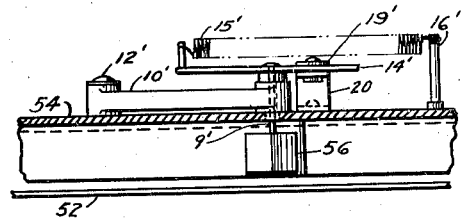

Fig. 8 is an enlarged sectional view showing the dividing mechanism as applied in Figs. 1-6; Fig. 9 is an end view in elevation of the application of my invention as shown in Fig. 3; Fig. 10 is a plan view of a modification of my invention as applied to a moving conveyer; Fig. 11 is a view in elevation of the modification shown in Fig. 10; Fig. 12 is a sectional view taken through 12—12 of Fig. 11, looking in the direction of the arrows; Fig. 13 is an enlarged plan view of the operating mechanism shown in Fig. 14; Fig. 14 is an enlarged sectional view taken through 14—14 of Fig. 10. I would call attention to the fact that in Figs. 1-11 the passages into which the bodies are distributed are in different vertical planes, and that is one of the important features of my invention; namely, delivering into a plurality of passages on different vertical planes from a single plane by means of a vane divider.

Similar numerals refer to similar parts throughout the several views.

Referring to the dividing mechanism as shown in the drawings, this dividing mechanism consists in the form shown of a dividing member or vane 1 shown in the form of a double obtuse wedge, or two surfaces 2 and 3, spaced apart to engage the cylindrical sides of the cans near the ends. The apex 4 of each side member or of said vane is turned upwardly and the upper converging surfaces 2 and 3 of the vane or wedges are shown as concave so that, they may fit, or substantially fit, the curvature of the cans.

Referring now to Fig. 10, which is a horizontal section taken above the dividing vane members I and looking down upon them, it will be noted that the two members I upon which are secured wedges 2 and 3 are placed at each side of the path of the cans, so that they engage the peripheral surfaces of the cans 7 and 8 at the ends only. These members I containing wedges 2 and 3 are connected by and secured to a transverse shaft 9 (see particularly Figs. 4, 7, and 8). This shaft is in turn supported on links or swinging arms 10 pivotally mounted above the wedges in the side plates II of the dividing mechanism at 12, so that the wedges are in effect mounted to swing from the bearings or studs 12 in the casing, the shaft 9 passing through and reciprocating in a slot 13 in the casing or side plates II, though this slot need have no guiding function.

The vane or dividing members I are further controlled in their operation by dividing control arm 14 secured to the shaft 9 and shown as located at the back of the casing II (see Figs. 7 and 8) which is a back view. This control arm 14 projects upwardly above the shaft 9 in the direction of the vertex 4 of the vane I, and at its upper end it is connected to a tension spring 15 which extends downwardly well below the shaft 9, being normally under tension and connected at its lower end at 16 to the side plate II, preferably in line with the central portion of the swinging arms 10, so that it tends to hold the arm 14 in either one of its extreme positions to the right or to the left of the shaft 9, the spring being elongated in its central position in which the control arm 14 is in alignment with the swinging arm 10. The spring tension thus serves whenever the arm 14 passes the central position in either direction to swing the arm to the extreme position in that direction.

The arm 14 is also extended below the shaft 9 at 17 and its lower end is slotted at 18 in the direction of its length, the slot being engaged by the stationary pin 19 mounted on a bracket 20 secured to the casing. This furnishes a guiding means for the arm 14, which in connection with the links or swinging arms 10, limits its extreme position, (though these positions might also be limited by the slot 13), and assists in swinging the vane.

The disclosure includes in Fig. 6 additional means which may be treated as alternative with the means shown in Fig. 5 or cooperating therewith to control the operation of the divider I. This means consists of a cam dog 21 secured to the shaft 9 shown on the front end of the same outside the casing. This dog projects upwardly in the direction of the point of the divider I, as does the arm 14, and is provided at its upper end with a cam surface 22 which co-operates with a cam roller 23 carried by a suitable rocking lever 24, the center or an intermediate point on the lever being pivoted at 25 on a suitable bracket and the end opposite to the roller 23 being given an upward tendency by a spring 26. This tendency has the effect of keeping the roller 23 in contact with or in the path of the cam surface 22. As shown in Fig. 9, the spring 26 being fully contracted, the roller 23 rests in the path of the can. The dog 21 is in the form of a lever, having its lower end slotted longitudinally at 27 to engage a stationary pin 28 on a suitable bracket.

Referring to Figs. 4 and 8, the cans in operation being introduced in suitable succession at the intake end of the machine by the ways 29, they are dropped successively through the downwardly disposed intake opening 30, coming in contact as they descend with the vane or dividing member I. In the position shown, a can 31 has just dropped on the left or forward side of the divider and is rolling off of the same, leaving it in its lefthand position. The next can 32 will then contact the divider in the position shown, striking the concave surface 3 of the two wedge members 2 and 3. The impact of the can tends to rock the vane to the right, swinging the cam dog 21 as shown in Fig. 6, or spring lever 14, as shown in Fig. 5 and/or the control arm to the righthand position, as indicated in Figs. 5 and 6. Under these circumstances the forked end of the control lever at 17 and/or the slotted end of the dog 21 will swing to the left as seen from the front, and the upper end of the lever 14 and of the dog 21 will swing to the right in Figs. 5 and 6, also swinging links 10 to the right carrying the vane I and shaft 9 with them. The path of the vane will be determined by the links 10 and the swinging of the vane is assisted or completed and determined by the rocking of the control arm 14 and/or the cam dog 21, the motion of one said member being checked and assisted by the spring 15, and of the other by the spring 26 and the roller 23. In both instances the result is substantially the same, the motion of the divider vane being first initiated and the parts being moved through the central position by the impact of the can. The movement is at first checked and then accelerated by the action of the springs, the divider being finally held at the limit of its movement in either direction by the springs 15 and 26. The divider thus has a marked and definite translatory motion in addition to the rocking motion, carrying with it the can 32 which is thus swung to the right and discharged downwardly into the lower path.

It will be easily understood that in this way the point of the vane is carried by each can completely across and beyond the path of the cans, and that the next can dropped through the intake opening will contact the concave surfaces or wedge 2 at the left of the vane, swinging the vane to the left and causing it to shift to the left.

The translatory motion of the vane whereby it is transferred bodily by each can with which it engages from one position to the other, giving a wide and definite separation of the cans thus directed to the different paths, which separation is thus effected uniformly without intermission or variation during the presentation of cans, and the consequent uniform division of the cans and avoidance of contact of the cans with the point 4 of the vane, eliminating injury to the cans, are important improvements in this portion of the machine.

Referring to Figs. 1, 2 and 3, it will be noticed that there are a plurality of vanes I whereby one passage feeds four passages. A modification of the dividing means is shown in Fig. 3, which figure shows a control means in the plural passages into which the bodies may be directed.

In practice, it has been found that where no control means is used in feeding from a single passage into a plurality of passages where the first passage has to be filled with bodies and then the bodies, rolling or passing over the last can in the first passage, enter the next succeeding passages and continue until all are filled, it is difficult to adjust the length of the first passage to fit the bodies fed, so that the last body in the filled passage will be in the exact correct position to avoid either a blocking of the delivering passage or the marring of the body. To avoid this, I provide an escapement movement at the entrance of the various passages to close the passage upon the positioning of a body in said passage at a desired point near its entrance.

I might mention here that I have shown two and four passages, though any number of passages may be controlled by these various means operated in combination.

Referring to the modification shown in Figs. 10–14, 52 is the conveyer belt operating over conveyer pulley 53. 54 is a supporting plate for carrying my divider mechanism when applied to a movable conveying device; 55 are brackets for supporting plate 54 and are secured at any convenient position to the conveying apparatus.

I might state here that I claim nothing concerning the belt conveyer per se, or its application to the carrying of bodies. I have simply shown in a more or less schematic way the conveyer, the pulley over which it operates and which is driven by means not shown, and have only illustrated my divider as applied with reference to said moving conveyer at some particular point in its travel where it is desired to form a plurality of passages from a single passage of bodies being conveyed.

56 is the modified vane which I have found preferable in the operation of the divider over a moving carrier, a single vane of considerable dimensions preferable over two vanes operating at the ends of the body as heretofore illustrated. Vane 56 as shown is mounted on shaft $9^1$, which shaft is entirely supported by lever $10^1$ and is journalled therein, said shaft having secured on the end thereof lever $14^1$. The securing of lever $14^1$ on shaft $9^1$ carries the weight of vane 56 against lever $10^1$, $10^1$ swinging on fulcrum $12^1$. I might call attention here to the fact that the operation of these various levers and vane are fully described as shown in Figs. 8 and 9, where the passages are in substantially the vertical, the passages in this modification being in the horizontal. The vane is supported by lever $14^1$ secured to shaft $9^1$ operating through lever $10^1$ on plate 54. The operation of these various levers and devices in the modification shown are similar to that heretofore described for Figs. 5 and 6, and will not be repeated here, the numerals in Figs. 10–14 being primed where the elements have been described heretofore in their functional use as unprimed numbers.

Tension spring $15^1$ is secured to plate 54 at $16^1$ and the other end being connected to lever $14^1$. Lever $14^1$ is provided with a slot $18^1$ at one end thereof, as shown in Fig. 13, which slot operates over stationary pin $19^1$, which pin is mounted on bracket $20^1$, said bracket being secured to plate 54. $13^1$ is a slot in plate 54 through which shaft $9^1$ swings. It will be noticed that there is only one support for vane 56, that is, at one end of shaft $9^1$, whereas, in the other views it has a support at each end and a swinging lever 10, while here lever $10^1$ is a sliding bar on plate 54 carrying entirely vane 56 as a bearing thereof. The operation of bodies passing by vane 56 is similar to that heretofore described concerning vane 1.

In these specifications and claims, when I use the term "vane", or "divider", I mean any movable means interposed in the line of travel of bodies in a single passage to alternately divert bodies into a plurality of passages.

And when I use the term "bodies", "cans", "bottles", or similar expressions herein, involving the subject matter to be conveyed, I mean a body being conveyed operating my dividing device.

And when I use the term "passage", in these specifications and claims, I mean the path which a body may take while being diverted by my improved divider.

I have shown and described specifically passages as adapted for rolling bodies operated by gravity therein. My conveyer divider is equally applicable for diverting bodies being carried on moving conveyers, in which event said bodies need not necessarily be round or travel by themselves but are conveyed. As illustrative, I might suggest a conveyer belt tending to carry bodies continuously in one direction, having superimposed thereon my dividing means. This feature is particularly illustrated in Fig. 10, and is especially useful in brick conveyers, fruit packing and many other arts where articles are conveyed on carrier belts to various distributing points.

Having thus described my invention, what I claim and desire to secure by Letters Patent is:

1. The combination with means for feeding a single line of cans of a dividing vane for deflecting the successive cans into two different chutes, means for guiding the cans on said chutes, means for supporting the vane in the path of the single line of cans whereby each can comes in contact with the vane, and means automatically actuated by the cans for actuating the vane operating in co-ordination with the impact of the cans against the vane to be tripped thereby to shift the fulcrum of the vane transversely to the path of the cans causing the successive cans to contact opposite sides of the vane, carrying the successive cans in different directions transverse to said path, one-half of the cans made up of alternate cans being delivered to one chute and the other half being delivered to the other chute.

2. The combination with means for feeding a single line of cans of a dividing vane for deflecting alternate cans in opposite directions, delivering them in two different chutes, means for supporting said vane in the path of the cans whereby each can in turn comes into contact with the vane, and means automatically actuated by the cans for actuating the vane, operating it in coordination with the impact of the cans against the vane to be tripped by each can in turn to shift the fulcrum of the vane transversely to the path of the cans carrying the alternate cans in opposite directions transversely to said chute, said means also serving to rock the vane so that the alternate cans contact the vane on opposite sides.

3. The combination with means for feeding a single line of cans of a dividing vane for deflecting alternate cans in opposite directions, means for supporting it in the path of the cans whereby the cans come in contact with the vane, and means automatically actuated by the cans for actuating the vane operating in co-ordination with the impact of the cans against the vane to shift the fulcrum of the vane transversely to the path of the cans, carrying the alternate cans in opposite directions transversely to said path, said means also serving to rock the vane so that the alternate cans contact the vane on opposite sides, the motion of the vane and of the can contacting it being in the direction of the side thus engaged by the can.

4. The combination with load-forming ways for cans of means for dividing a single line of cans into a plurality of chutes comprising a dividing vane, means for supporting the vane whereby it is permitted to rock transversely to the path of the cans and to be shifted transversely to said path as each can contacts the vane consisting of a fulcrum upon which said vane operates and means for bodily moving said fulcrum transversely, the rocking motion of the vanes and the transverse shifting serving to present opposite sides of the vane to the alternate cans from opposite sides of the path of the can, the transverse motion in each instance being in the direction of the side being thus engaged by the can.

5. The combination with load-forming ways for cans of means for dividing a single line of cans into a plurality of lines comprising a dividing vane, means for supporting the vane whereby it is permitted to rock transversely to the path of the cans and to shift transversely thereto as each can contacts the vane, the rocking motion of the vanes and the transverse motion serving to present opposite sides of the vane to the alternate cans from opposite sides of the path of the can, the transverse action in each instance being in the direction of the side being thus engaged by the can, the supporting means comprising a link pivotally supporting the vane and pivotally mounted on the side of the vane from which the cans are moving and controlling means for said vane comprising a lever mounted to swing from a point on the opposite side of said vane from said link, the resilient means tending to move the vane when displaced from mid-position toward the nearest extreme position.

6. The combination with load-forming ways for cans of means for dividing a single line of cans into a plurality of lines comprising a dividing vane, means for supporting the vane whereby it is permitted to rock transversly to the path of the cans and to move transversely thereto as each can contacts the vane, the rocking motion of the vanes and the transverse motion serving to present opposite sides of the vane to the alternate cans from opposite sides of the path of the cans, the transverse motion in each instance being in the direction of the side being thus engaged by the can, the supporting means comprising a link pivotally supporting the vane and pivotally mounted on the side of the vane from which the cans are moving, and controlling means for said vane comprising a lever mounted to swing from the opposite side of said vane from said link and resilient means tending to move the vane when displaced from mid-position by the impact of a can toward the extreme position on the side of the vane contacted by said can, said resilient means tending to check the motion of the vane toward mid-position.

7. In a conveyor system, a primary chute through which circular bodies may roll, four secondary chutes through which circular bodies may roll as fed from said primary chute, means for alternately feeding articles from said primary chute to said four secondary chutes consisting of three vanes, each automatically actuated by the bodies to move the same bodily transversely of the path of the bodies rolling thereby partially rotating and shifting the axis upon which it rotates to permit a circular body to pass thereby, one of said vanes being a master vane alternately distributing bodies from said primary chute to feed said secondary vanes coordinated therewith, each of which controls the delivery to two of said secondary chutes alternately delivering bodies received through the master vane to said chutes.

8. In a conveying system, a chute for cylindrical bodies comprising, a single chute through which said bodies may roll, a plurality of chutes similarly through which said bodies may roll, a control means distributing said bodies in rolling contact from said single chute to said plurality of chutes alternately comprising a movable vane fulcrumed on a movable fulcrum automatically actuated by the bodies to move the same bodily transversely of the path of the bodies rolling thereby whereby the rolling of the bodies on said vane while passing thereby operate said fulcrum to position said vane to receive the next succeeding body and discharge the same into another of said chutes itself being operated by said succeeding body.

CHARLES H. WILD.